United States Patent
Wilairat et al.

(10) Patent No.: US 9,727,136 B2
(45) Date of Patent: Aug. 8, 2017

(54) GAZE DETECTION CALIBRATION

(71) Applicant: Microsoft Technology Licensing, LLC, Redmond, WA (US)

(72) Inventors: Weerapan Wilairat, Sammamish, WA (US); Vaibhav Thukral, Kirkland, WA (US); David Nister, Bellevue, WA (US); Morgan Kolya Venable, San Francisco, CA (US); Bernard James Kerr, Sausalito, CA (US); Chris Aholt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 14/281,755

(22) Filed: May 19, 2014

(65) Prior Publication Data

US 2015/0331485 A1    Nov. 19, 2015

(51) Int. Cl.
*G06F 3/01* (2006.01)
*G02B 27/01* (2006.01)
(Continued)

(52) U.S. Cl.
CPC ......... *G06F 3/013* (2013.01); *G02B 27/0172* (2013.01); *G06F 1/163* (2013.01);
(Continued)

(58) Field of Classification Search
CPC ................ G06F 3/013; G02B 27/0172; G02B 2027/0178; G06K 9/00604
See application file for complete search history.

(56) References Cited

U.S. PATENT DOCUMENTS 5,844,544 A    12/1998 Kahn et al.
6,578,962 B1    6/2003 Amir et al.
(Continued)

FOREIGN PATENT DOCUMENTS

DE   WO 2012052061 A1 *  4/2012  ............ G06F 3/013
WO        2013059940 A1    5/2013
WO        2015026842 A1    2/2015

OTHER PUBLICATIONS

Sugano, Y. et al., "Appearance-Based Gaze Estimation Using Visual Saliency," IEEE Transactions on Pattern Analysis and Machine Intelligence, vol. 35, No. 2, Feb. 2013, Available Online Apr. 26, 2012, 13 pages.
(Continued)

*Primary Examiner* — Lun-Yi Lao
*Assistant Examiner* — Kelly Hegarty
(74) *Attorney, Agent, or Firm* — Alleman Hall Creasman & Tuttle LLP

(57) ABSTRACT

Examples relating calibrating an estimated gaze location are disclosed. One example method comprises monitoring the estimated gaze location of a viewer using gaze tracking data from a gaze tracking system. Image data for display via a display device is received and, without using input from the viewer, at least one target visual that may attract a gaze of the viewer and a target location of the target visual are identified within the image data. The estimated gaze location of the viewer is compared with the target location of the target visual. An offset vector is calculated based on the estimated gaze location and the target location. The gaze tracking system is calibrated using the offset vector.

14 Claims, 13 Drawing Sheets

(51) Int. Cl.
G06K 9/00 (2006.01)
G06F 1/16 (2006.01)
G06F 3/0484 (2013.01)

(52) U.S. Cl.
CPC .......... *G06F 3/011* (2013.01); *G06F 3/04842* (2013.01); *G06K 9/00604* (2013.01); *G02B 2027/0178* (2013.01)

(56) References Cited

U.S. PATENT DOCUMENTS

| | | | |
|---|---|---|---|
| 6,637,883 B1 | 10/2003 | Tengshe et al. | |
| 6,659,611 B2* | 12/2003 | Amir | G06K 9/00604 351/210 |
| 7,433,029 B1* | 10/2008 | Hsu | G01B 11/26 356/141.5 |
| 7,657,062 B2 | 2/2010 | Pilu | |
| 7,963,652 B2 | 6/2011 | Vertegaal et al. | |
| 8,235,529 B1* | 8/2012 | Raffle | A61B 3/113 351/209 |
| 8,457,352 B2* | 6/2013 | Hennessey | A61B 3/113 382/103 |
| 8,941,561 B1* | 1/2015 | Starner | G09G 5/00 345/7 |
| 8,982,046 B2* | 3/2015 | Edwards | A61B 3/113 345/156 |
| 2003/0098954 A1* | 5/2003 | Amir | A61B 3/113 351/210 |
| 2009/0141895 A1 | 6/2009 | Anderson et al. | |
| 2011/0170067 A1* | 7/2011 | Sato | G06K 9/00604 351/209 |
| 2011/0279666 A1* | 11/2011 | Strombom | G06K 9/00604 348/78 |
| 2011/0310006 A1* | 12/2011 | Edwards | A61B 3/113 345/156 |
| 2012/0105486 A1 | 5/2012 | Lankford et al. | |
| 2012/0272179 A1 | 10/2012 | Stafford | |
| 2013/0050833 A1* | 2/2013 | Lewis | G06T 7/0042 359/630 |
| 2013/0069985 A1* | 3/2013 | Wong | G02B 27/017 345/633 |
| 2013/0083003 A1* | 4/2013 | Perez | G06F 3/005 345/419 |
| 2013/0083009 A1* | 4/2013 | Geisner | A63F 13/02 345/419 |
| 2013/0114043 A1* | 5/2013 | Balan | H04N 13/044 351/210 |
| 2013/0321265 A1 | 12/2013 | Bychkov et al. | |
| 2013/0325463 A1* | 12/2013 | Greenspan | G06F 3/013 704/235 |
| 2014/0055591 A1 | 2/2014 | Katz | |
| 2014/0375546 A1* | 12/2014 | Yamada | G06F 3/017 345/156 |
| 2015/0062323 A1* | 3/2015 | Gustafsson | G06F 3/013 348/78 |

OTHER PUBLICATIONS

Pfeuffer, K. et al., "Pursuit Calibration: Making Gaze Calibration Less Tedious and More Flexible," 26th annual ACM symposium on User Interface Software and Technology (UIST '13), Oct. 8, 2013, 9 pages.

ISA European Patent Office, International Search Report and Written Opinion Issued in Application No. PCT/US2015/031267, Jul. 23, 2015, WIPO, 13 Pages.

Nagamatsu, Takashi et al., "Automatic User Calibration for Gaze-Tracking Systems by Looking into the Distance", 3rd International Workshop on Pervasive Eye Tracking and Mobile Eye-Based Interaction, Aug. 13, 2013, 6 pages.

Jacob, R., "Natural Dialogue in Modes Other Than Natural Language," In Book—"Dialogue and Instruction: Modelling Interaction in Intelligent Tutoring Systems", NATO ASI Series F: Computer and Systems Sciences, vol. 142, May 26, 1995, Springer, Berlin, Germany, 11 Pages.

IPEA European Patent Office, Second Written Opinion Issued in Application No. PCT/US2015/031267, Apr. 21, 2016, WIPO, 7 Pages.

IPEA European Patent Office, International Preliminary Report on Patentability Issued in PCT Application No. PCT/US2015/031267, Jul. 28, 2016, WIPO, 9 pages.

* cited by examiner

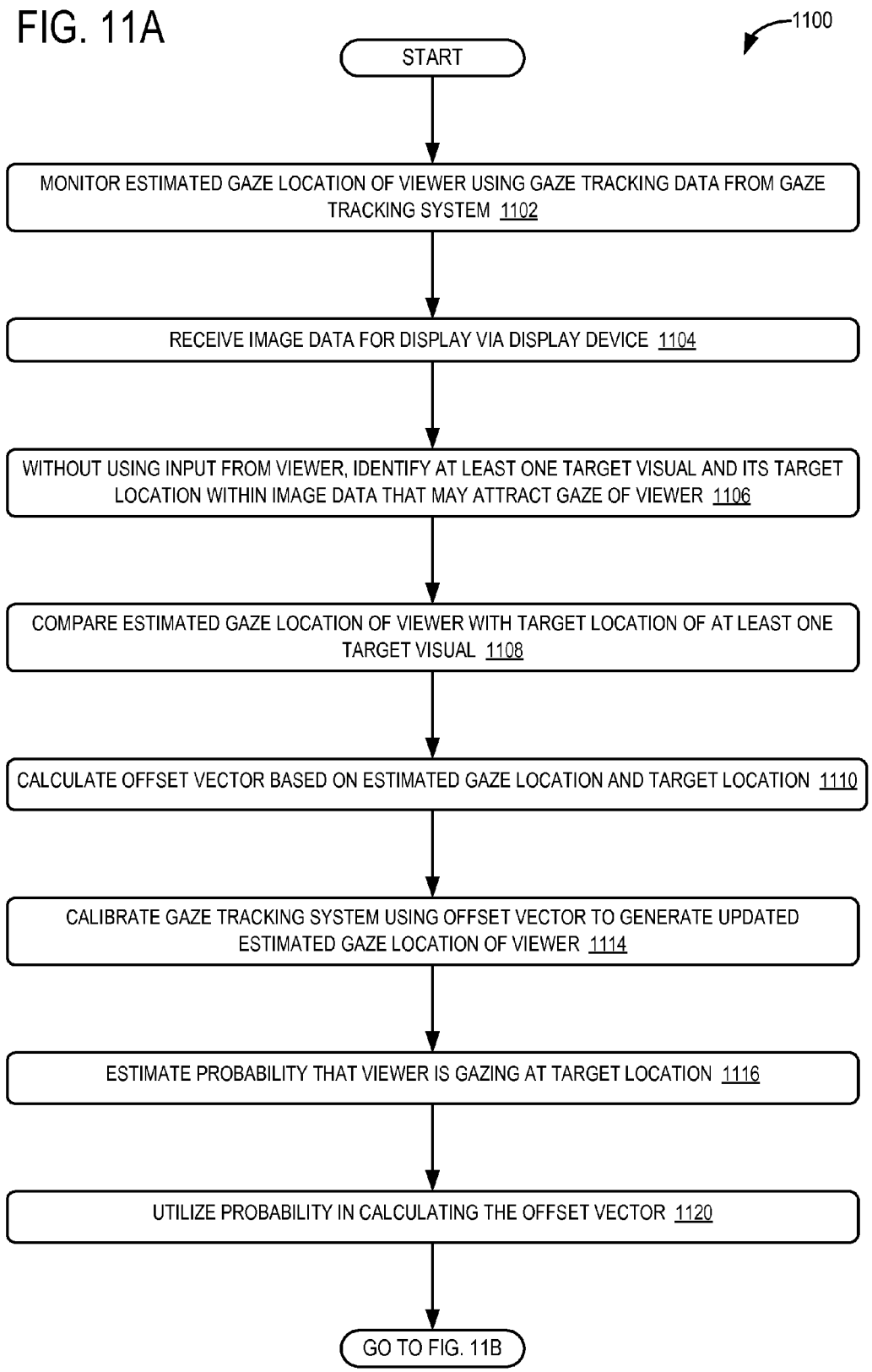

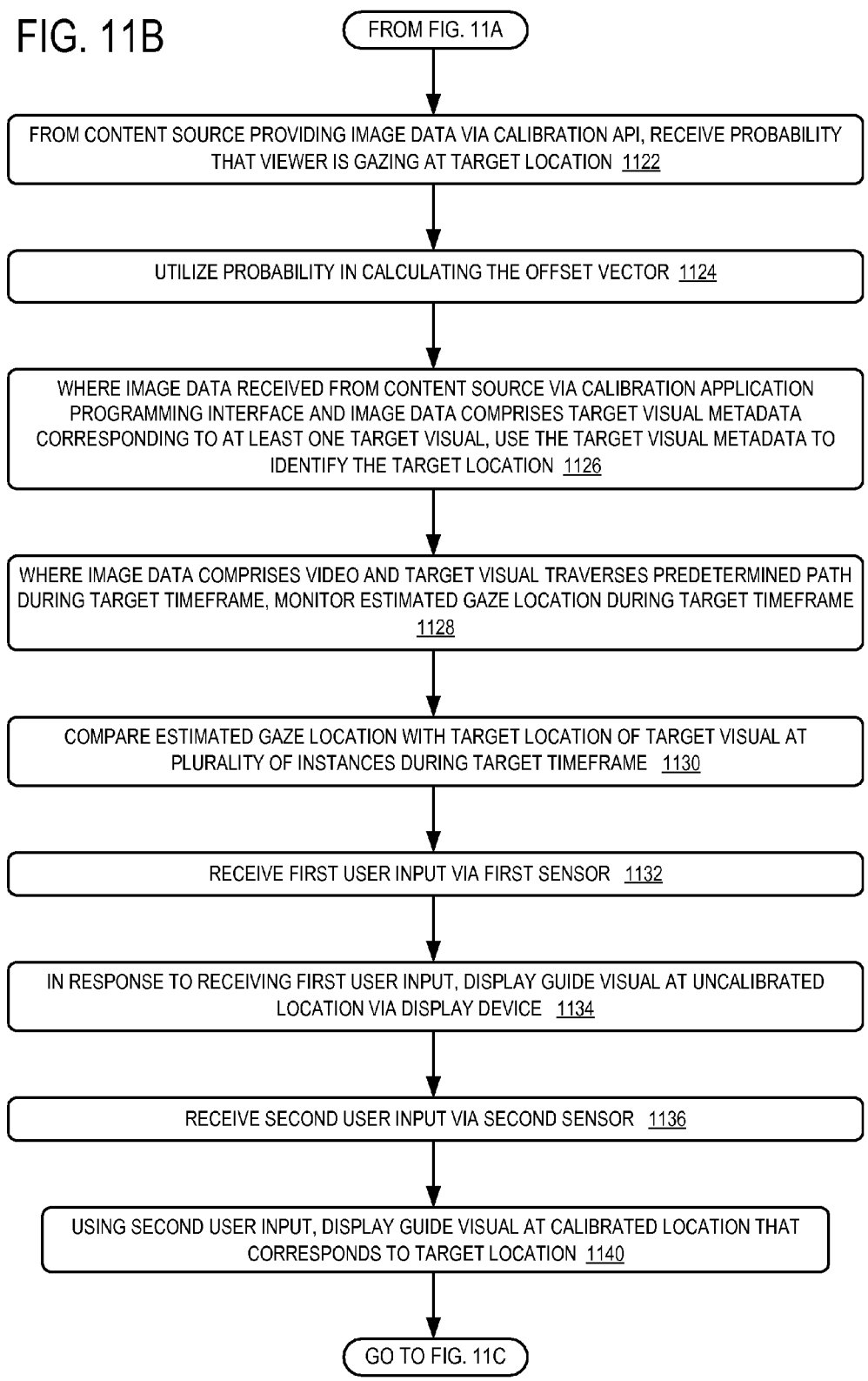

GAZE DETECTION CALIBRATION

BACKGROUND

Content creation and/or delivery devices may utilize gaze tracking systems to track a location of a user's gaze. Calibration of such gaze tracking systems may be periodically performed to correct inaccuracies resulting from, for example, user head movement, changing illumination conditions, a viewer wearing glasses, etc. Calibration procedures may also be performed to determine user-specific parameters, such as biometric parameters of a user's eye, or system-specific parameters, such as relative locations of a display screen and image capture devices. For various reasons, such calibration procedures may need to be re-performed during system operation, such as if the user is replaced by a different user, or if a display system moves more than expected.

Calibration procedures for gaze tracking systems may affirmatively instruct or direct a user to gaze at one or more points displayed at known locations on a display screen. Gaze tracking data is then used to calibrate the gaze tracking system. However, such dedicated calibration procedures may interfere with a user's immersion in a current user experience provided by the display. Periodically repeating such procedures to recalibrate the gaze tracking system may further increase user frustration.

SUMMARY

Various examples are disclosed herein that relate to calibrating an estimated gaze location of a viewer of a display device. In one disclosed method, the estimated gaze location of a viewer is monitored using gaze tracking data from a gaze tracking system. Image data for display via the display device is received. Without using input other than a user's eye gaze direction from the viewer, at least one target visual that may attract a gaze of the viewer and a target location of the target visual are identified within the image data.

The estimated gaze location of the viewer is compared with the target location of the at least one target visual. An offset vector based on the estimated gaze location and the target location is calculated. The gaze tracking system is then calibrated using the offset vector to generate an updated estimated gaze location of the viewer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 11A, 11B, 11C, and 11D are a flow chart of a method for calibrating an estimated gaze location of a viewer of a display device according to an example of the present disclosure.

DETAILED DESCRIPTION

Figure 1:
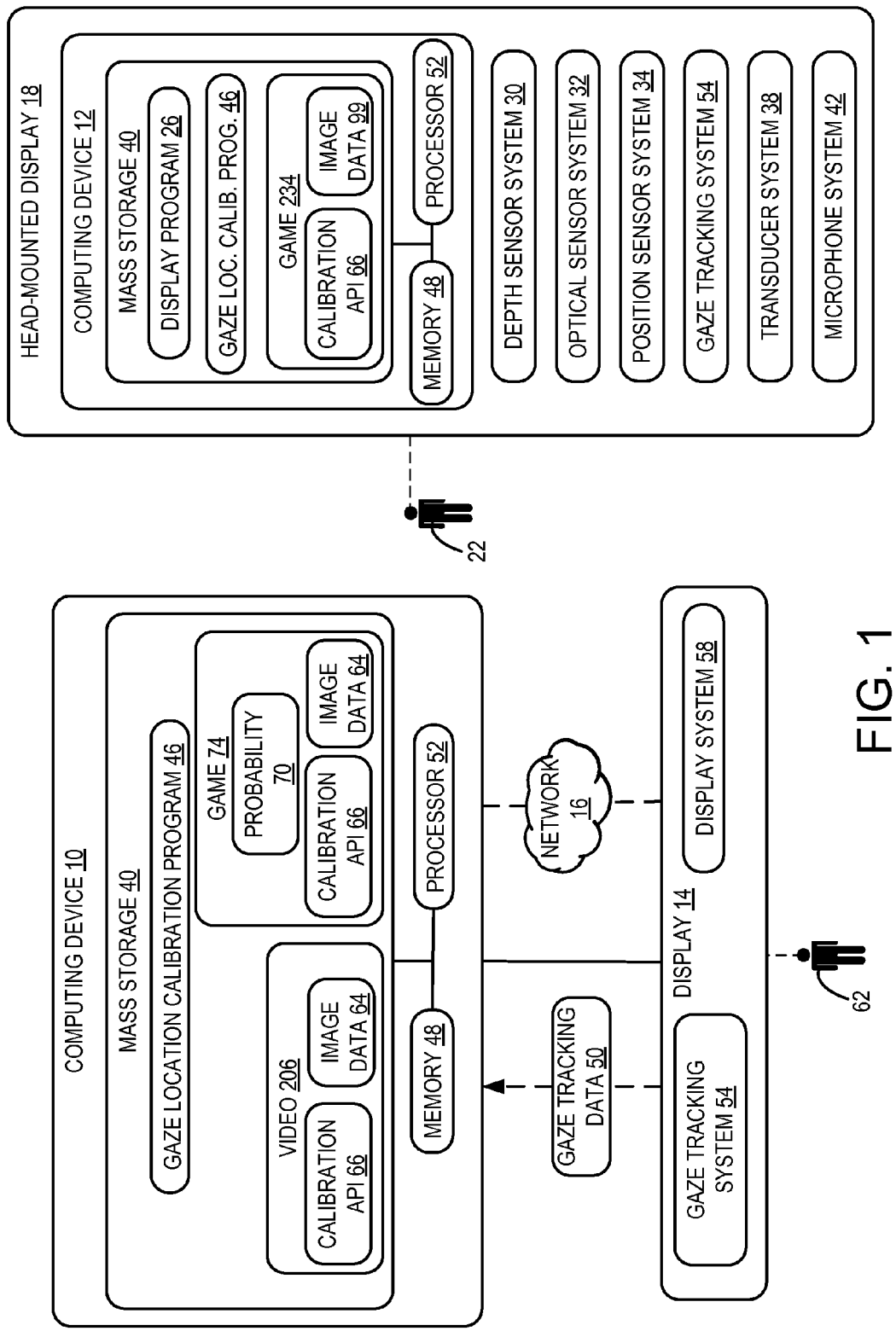
FIG. 1 is a schematic view of example computing devices that may be utilized with displays to calibrate an estimated gaze location according to examples of the present disclosure.

FIG. 1 shows a schematic view of example implementations of a computing device that may be utilized to calibrate an estimated gaze location of a viewer of a display device. As described in more detail below, in one example a gaze location calibration program uses gaze tracking data from a gaze tracking system to monitor an estimated gaze location of a viewer. The gaze location calibration program may receive image data for display via the display device and, without using input other than a user's eye gaze direction from the viewer, may identify within the image data at least one target visual that may attract a gaze of the viewer and a target location of the target visual.

The gaze location calibration program may then compare the estimated gaze location of the viewer with the target location of the target visual. Using the estimated gaze location and the target location, the program calculates an offset vector. The gaze tracking system is then calibrated using the offset vector to generate an updated estimated gaze location of the viewer.

In various examples, the computing device may be either physically separated from or integrated into a display device with which a viewer may interact. FIG. 1 schematically shows an example of a computing device 10 that is physically separated from a display device 14. In this example, the computing device 10 may comprise or be integrated into a separate device, such as a set-top box, gaming console, web camera, head-mounted computing device or other wearable computing device, keyboard, dedicated peripheral, or other like device that does not include an integrated display.

The computing device 10 may be operatively connected with the display device 14 using a wired connection, or may employ a wireless connection via WiFi, Bluetooth, or any other suitable wireless communication protocol. For example, the computing device 10 may be communicatively coupled to a network 16. The network 16 may take the form of a local area network (LAN), wide area network (WAN), wired network, wireless network, personal area network, or a combination thereof, and may include the Internet. Additional details regarding the components and computing aspects of the computing device 10 are described in more detail below with reference to FIG. 12.

FIG. 1 also shows an example of a computing device 12 integrated into a head-mounted display (HMD) device 18. The HMD device 18 may create and display to a first viewer 22 a virtual reality environment or a mixed reality environment. In these examples, the HMD device 18 may include a display program 26 that may generate the virtual environment or mixed reality environment for display via the HMD device. The virtual environment may include one or more visual elements in the form of virtual images, such as three-dimensional (3D) holographic objects and two-dimensional (2D) virtual images, that are generated and displayed via HMD device 18. In a mixed reality environment, the HMD device 18 may enable the viewer to view such holographic objects and virtual images within the physical environment surrounding the viewer.

As described in more detail below, in some examples the HMD device 18 may comprise a transparent, semi-transparent or non-transparent display that is supported in front of a viewer's eye or eyes. The HMD device 18 may include various sensors and related systems that receive physical environment data from a physical environment. For example, the HMD device 18 may include a depth sensor system 30 that includes one or more depth cameras that generate depth image data.

In some examples the HMD device 18 may include an optical sensor system 32 that utilizes at least one outward facing sensor, such as an RGB camera or other optical sensor. The outward facing sensor may capture two-dimensional image information from the physical environment. The HMD device 18 may also include a position sensor system 34 comprising one or more accelerometers, gyroscopes, head tracking systems, and/or other sensors for determining a position or orientation of a user.

The HMD device 18 may also include a transducer system 38 comprising one or more actuators that convert an electrical signal into another form of energy. In some examples, the transducer system 38 may include one or more speakers for providing audio feedback to a viewer. In other examples the transducer system 38 may include one or more tactile transducers for generating and providing haptic feedback to the viewer, such as vibrations. The HMD device 18 may also include a microphone system 42 and one or more microphones for receiving audio input from the physical environment.

Additionally, the example illustrated in FIG. 1 shows the computing device 12 integrated into the HMD device 18. It will be appreciated that in other examples the computing device 12 may be a separate component from the HMD device 18. Many types and configurations of HMD devices 18 having various form factors may be used and are within the scope of the present disclosure. A more detailed description of an example HMD device is provided below with reference to FIG. 10.

It also will be appreciated that the computing device 12 may comprise or be integrated into any other suitable type or form of display device or other computing device, such as a tablet, notebook, smartphone, or other mobile computing device, desktop computing device, standalone monitor, wall-mounted display, interactive whiteboard, or other like device having an integrated display. Such devices may also include a gaze tracking system, as described in more detail below.

Both computing device 10 and computing device 12 may include a gaze location calibration program 46 that may be stored in mass storage 40. The gaze location calibration program 46 may be loaded into memory 48 and executed by a processor 52 to perform one or more of the methods and processes described in more detail below.

Computing device 10 and computing device 12 may receive gaze tracking data 50 from a gaze tracking system 54. In various examples the gaze tracking system 54 may be located in display device 14, HMD device 18, or in a common enclosure with any other suitable type or form of display device, including but not limited to those example devices having an integrated display discussed above. In other examples, the gaze tracking system 54 and computing device 10 may be integrated into a common enclosure that does not include an integrated display, such as a head-mounted or other wearable device, or in any other suitable type or form of computing device that does not include an integrated display, including but not limited to those example devices without an integrated display discussed above. More detailed descriptions of example gaze tracking systems 54 are discussed below with reference example HMD device 1000 illustrated in FIG. 10.

With continued reference to FIG. 1, the example display device 14 may include a display system 58 for presenting one or more visual elements to a second viewer 62. As described in more detail below, the gaze location calibration program 46 may utilize gaze tracking data 50 from the gaze tracking system 54 to determine an estimated gaze location of a viewer and to calculate an offset vector based on the estimated gaze location and the location of a target visual displayed by display device 14, HMD 18 or other display device. The offset vector may be used to calibrate the gaze tracking system and to update an estimated gaze location of the viewer.

Figure 2:
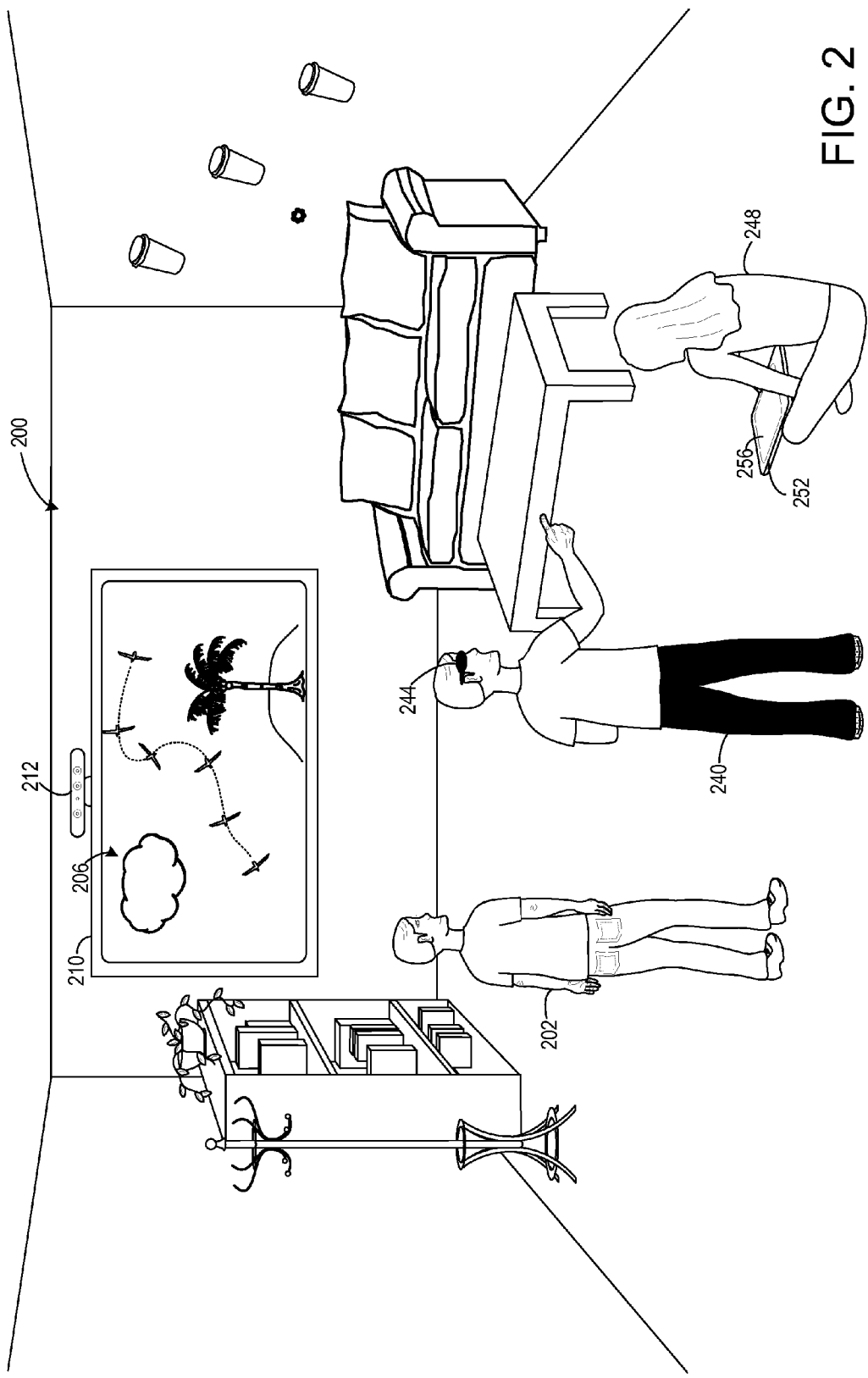
FIG. 2 is a schematic illustration of viewers in a room interacting with computing devices and displays that may calibrate an estimated gaze location of a viewer according to examples of the present disclosure.

With reference now to FIGS. 2-9, descriptions of example use cases will now be provided. FIG. 2 is a schematic illustration of several viewers in a room 200 interacting with computing and display devices that use gaze tracking data from gaze tracking systems. In one example, viewer James 202 is watching a video 206 that is displayed on a wall-mounted display 210. In various examples the video 206 may be an interactive video, a portion of a game, or other content that may provide an interactive experience via gaze tracking. In this example, wall-mounted display 210 is communicatively coupled to a set-top box 212 that comprises a gaze tracking system 54 and a computing device that includes gaze location calibration program 46. Using gaze tracking data 50 from the gaze tracking system 54, the gaze location calibration program 46 may monitor the estimated gaze location of viewer James 202 on the screen of the wall-mounted display 210.

Figure 3:
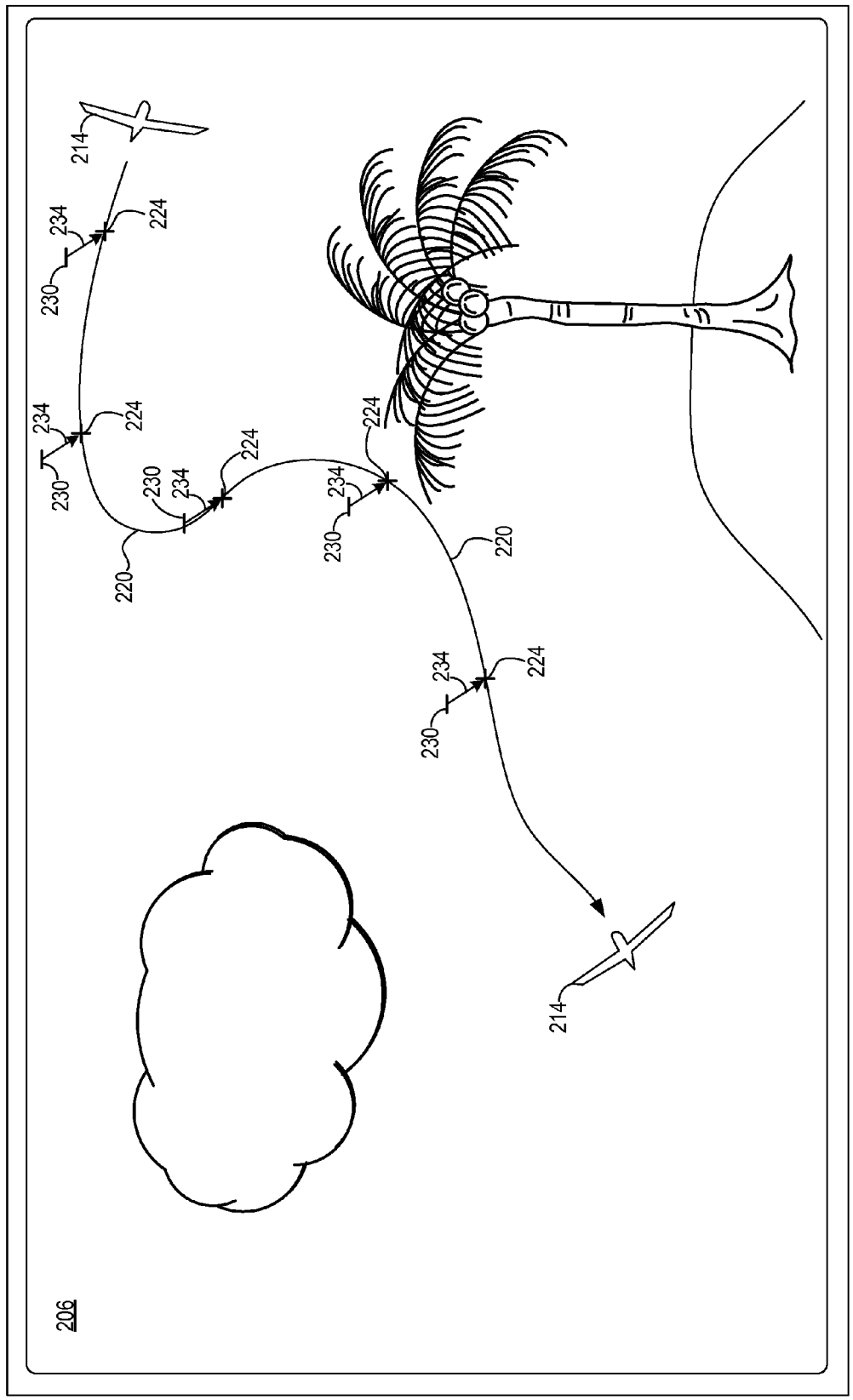
FIG. 3 is a schematic illustration of video displayed on a display device that may be used to calibrate the estimated gaze location of a viewer according to an example of the present disclosure.
Figure 4:
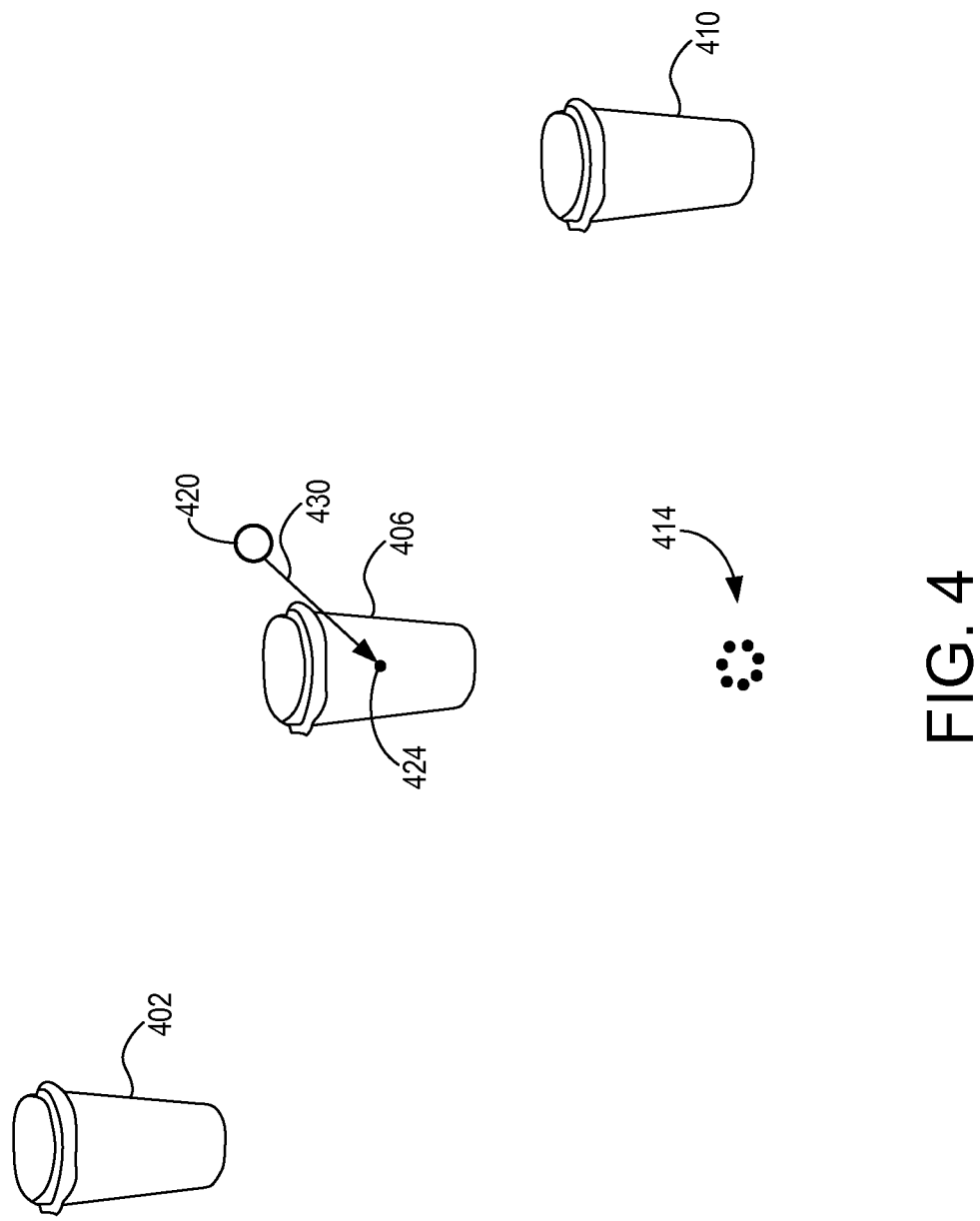
FIG. 4 is a schematic illustration of several images displayed via a display device that may be used to calibrate the estimated gaze location of a viewer according to an example of the present disclosure.

With reference also to FIG. 1, the gaze location calibration program 46 may receive image data 64 comprising the video 206 via a calibration application programming interface (API) 66. With reference now to FIG. 3, in this example the image data 64 may include a target visual in the form of a computer-generated soaring bird 214. As the video 206 plays, the bird 214 may soar through the sky along a predetermined path 220 comprising a plurality of target locations during a target timeframe. In various examples the target timeframe may comprise 2 seconds, 4 seconds, 6 seconds, or any other suitable timeframe. The flight and movement of the bird 214 may be rendered to appear realistic and natural to a viewer, such that the viewer may be naturally inclined to follow the flight of the bird.

Advantageously in some examples, and without using input other than viewer James 202's eye gaze direction, the gaze location calibration program 46 may analyze the image data 64 to programmatically determine that the soaring bird 214 may attract a gaze of viewer James 202. For example, the gaze location calibration program 46 may determine that the visual impact of the soaring bird is significantly more interesting to a viewer than the stationary cloud, palm tree and other elements of the video 206. Accordingly, the gaze location calibration program 46 may determine that viewer James 202 will direct his gaze to the bird 214 as it travels along the predetermined path 220.

In some examples, the image data 64 may comprise target visual metadata that affirmatively designates the bird 214 as a target visual that is likely to attract the attention of a viewer. The gaze location calibration program 46 may be configured to use such target visual metadata to identify the bird and its target location in the video 206. For example, the developer of video 206 may include target visual metadata that identifies the bird 214 as likely to attract the attention of a viewer and correspondingly to be followed by the viewer's gaze. Advantageously, the gaze location calibration program 46 may utilize such developer-provided metadata in calibrating the gaze tracking system as discussed below.

The gaze location calibration program 46 may further identify target locations 224 of the bird 214 as it traverses the predetermined path 220. Examples of such target locations 224 are illustrated in the example of FIG. 3 by "+" signs. Using gaze tracking data from the gaze tracking system 54, the gaze location calibration program 46 may monitor the estimated gaze location 230 of viewer James 202 during the target timeframe, and at instances that are temporally correlated with the target locations 224. Examples of such estimated gaze locations 230 are illustrated in the example of FIG. 3 by "−" signs.

The gaze location calibration program 46 may compare the estimated gaze locations 230 with the target locations 224 at a plurality of such corresponding instances during the target timeframe. For each comparison an offset vector 234 may be calculated based on the estimated gaze location 230 and the corresponding target location 224 at that instance. Using the offset vectors 234, the gaze location calibration program 46 may then calibrate the gaze tracking system 54 to generate an updated gaze location of viewer James 202. For example, the updated gaze location may substantially correspond to target locations 224 along the predetermined path 220. Additionally, because viewer James 202 perceives the bird 214 as a naturally-occurring feature of video 206, the gaze location calibration program 46 advantageously may calibrate the gaze tracking system 54 without interrupting or distracting James from his immersive experience in watching the video.

In some examples, the gaze location calibration program 46 may estimate a probability 70 that viewer James 202 is gazing at a target location 224 of the bird 214. For example, the location calibration program 46 may analyze various visual elements of the video 206 and estimate that, while the bird 214 is soaring through the sky past the palm tree and cloud, it is 85% probable that viewer James 202 is following and gazing at the bird. For example, the gaze location calibration program 46 may determine the probability based on the visual impact of the soaring bird being significantly more interesting to a viewer than the stationary cloud, palm tree and other elements of the video 206. It will be appreciated that any suitable method for determining such a probability may be utilized and is within the scope of the present disclosure.

Such probability 70 may then be used to calculate the offset vectors and determine an updated estimated gaze location. For example, where one offset vector exceeds a predetermined threshold offset value, this could indicate that viewer James 202 has looked away from the bird 214 at that particular instance. Combining the 85% probability with the offset vector exceeding the predetermined threshold offset, the gaze location calibration program 46 may exclude this offset vector sample from the other offset vector samples in calibrating the gaze tracking system 54.

In another example, the gaze location calibration program 46 may receive via the calibration API 66 metadata comprising a probability that viewer James 202 is following and gazing at the bird 214 in the video 206. As in the previous example, combining the probability with the offset vector exceeding a predetermined threshold offset, the gaze location calibration program 46 may exclude this offset vector sample from the other offset vector samples in calibrating the gaze tracking system 54. It will also be appreciated that such a probability may be utilized in any other suitable manner to calculate an offset vector and/or calibrate the gaze tracking system.

As another example, such a probability could be used to appropriately scale the importance of the offset vector calculated with respect to the bird 214. If the probability is high that James 202 is looking at the bird 214, and the probability is low that he is looking at the palm tree, then the offset vector with respect to the bird 214 is weighted as being more important than an offset vector with respect to the palm tree.

In other examples, the gaze location calibration program 46 may identify a plurality of target locations that each correspond to one of a plurality of target visuals within image data that may attract the gaze of the viewer. For example and with reference now to FIGS. 2 and 4, viewer Julius 240 may be immersed in a mixed reality experience provided by an application that uses image data to generate holograms displayed via an HMD device 18 in the form of glasses 244. In this example, the holograms may comprise three coffee cups 402, 406 and 410 and a spinning circle of dots 414 that are displayed during a loading procedure of the application.

The gaze location calibration program 46 may determine that an estimated gaze location 420 of viewer Julius 240 is nearest to a target location 424 that corresponds to the middle coffee cup 406. Accordingly, the gaze location calibration program 46 may determine that viewer Julius 240 is actually gazing at the middle coffee cup 406. The gaze location calibration program 46 may then calculate an offset vector 430 based on the estimated gaze location 420 and the target location 424 of the middle coffee cup 406. The target location 424 may correspond to the centroid of the coffee cup 406, a point on the periphery of the coffee cup, or any other suitable location on the image of the coffee cup.

In other examples, the gaze location calibration program 46 may be configured to utilize input from a viewer to calibrate a gaze tracking system. For example and with reference now to FIGS. 2, 5 and 6, viewer Rebecca 248 may play a computer game 74 on her tablet computer 252. The tablet computer 252 may include a display comprising touch-sensitive screen 256, a gaze tracking system 54 and a gaze location calibration program 46.

Figure 5:
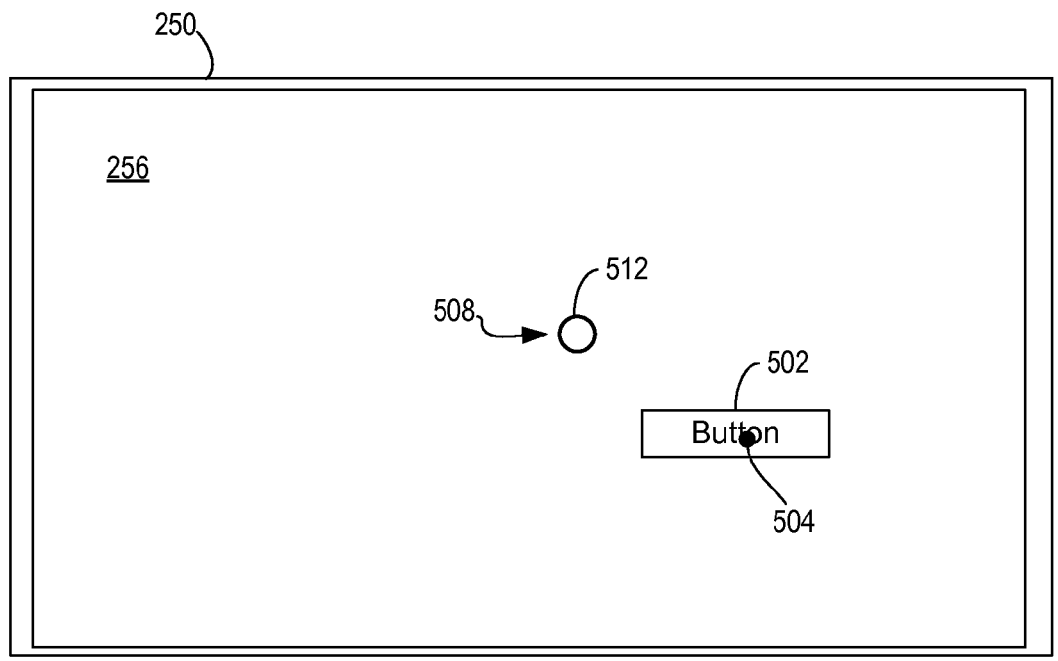
FIGS. 5 and 6 are schematic illustrations of a user interface displayed on a display device that may be used to calibrate the estimated gaze location of a viewer according to an example of the present disclosure.
Figure 6:
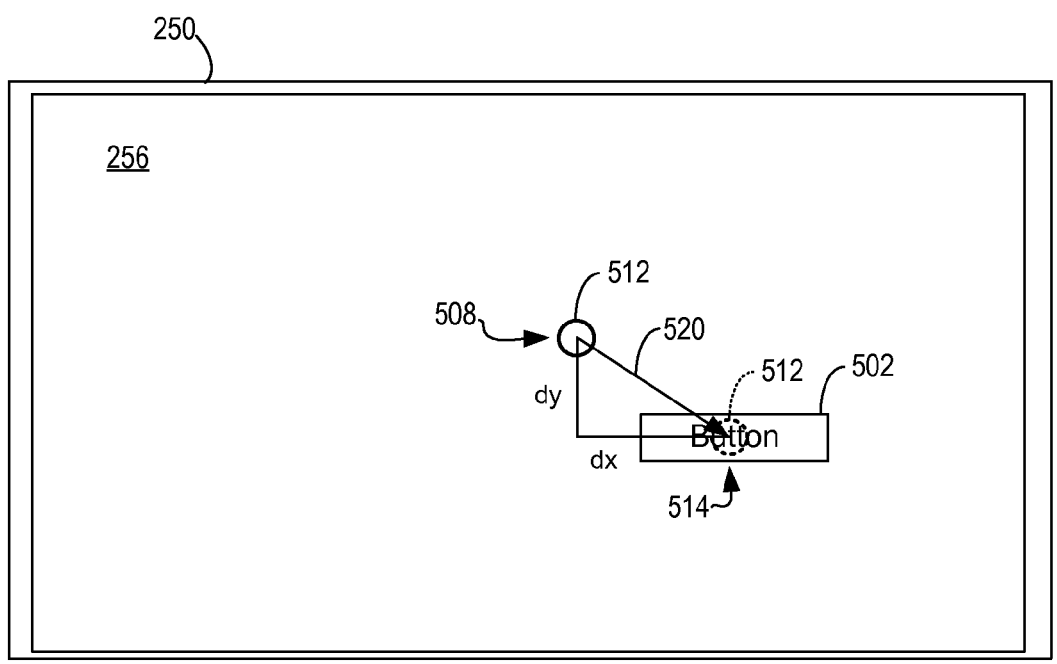

With reference now to FIGS. 5 and 6, in one example the gaze location calibration program 46 may be configured to control the tablet computer 252 to display a selectable button 502 on touch-sensitive screen 256. Viewer Rebecca 248 may naturally gaze at the button 502 when it appears. This actual gaze location of viewer Rebecca 248 is illustrated by actual gaze location indicator 504 in FIG. 5.

The gaze tracking system 54 of the tablet computer 252 may track and estimate an uncalibrated location 508 of viewer Rebecca's gaze location. In some examples, such estimated, uncalibrated gaze location 508 may be offset from her actual gaze location. For example and as shown in FIG. 5, while her actual gaze location 504 may correspond to the button 502, the estimated, uncalibrated gaze location 508 may be spaced from the button.

To initiate a calibration operation, viewer Rebecca 248 may provide a predetermined user input via the tablet computer 252. In response, the gaze location calibration program 46 may control the tablet computer 252 to display a guide visual 512 at the uncalibrated location 508. In the example of FIG. 5, the guide visual 512 is illustrated as a circle and the button 502 is illustrated as a rectangular region. It will be appreciated that any other suitable shapes may be utilized for the guide visual 512 and button 502.

In one example, the predetermined user input may comprise viewer Rebecca 248 pressing and holding a physical button on the tablet computer 252 for at least a predetermined triggering timeframe, such as 200 milliseconds (ms), 300 ms, 400 ms, or any other suitable timeframe. It will be appreciated that the predetermined user input may also comprise any other suitable user input including, but not limited to, touching the touch-sensitive screen 256 at a location corresponding to the button 502 or another designated location, performing a gesture that is captured by a depth sensor system 30, gazing at button 502 for at least a predetermined dwell time, etc.

When viewer Rebecca 248 sees the guide visual 512 appear at the uncalibrated location 508, her attention and gaze are naturally attracted to the visual. Viewer Rebecca 248 may then provide recalibrating user input that moves the guide visual 512 from its initial, uncalibrated gaze location 508 to a calibrated location 514 corresponding to the location of the button 502 as shown in FIG. 6. In the present example, upon receiving the recalibrating user input the gaze tracking system 54 may be disabled, and the recalibrating user input may be received from a sensor different from the sensor that provided the predetermined input. For example, viewer Rebecca 248 may provide the recalibrating user input via a head-tracking sensor and/or other position sensor, depth camera, trackpad, mouse or any other suitable sensor or input device. In other examples, upon receiving the recalibrating user input the gaze tracking system 54 may not be disabled, and the recalibrating user input may be received from the same sensor that provided the predetermined input.

With reference to FIG. 6, in one example viewer Rebecca 248 may use head movements to provide recalibrating user input via a head-tracking sensor to drive the guide visual 512 from the initial, uncalibrated gaze location 508 to the calibrated location 514. In response, the gaze location calibration program 46 may control the tablet computer 252 to display the guide visual 512 at the calibrated location 514 that corresponds to the location of the button 502. The gaze location calibration program 46 may then calculate an offset vector 520 based on the uncalibrated location 508 and the calibrated location 514.

It will be appreciated that the offset vector may comprise a horizontal dx component and a vertical dy component that represent an error in the estimated gaze location. The gaze location calibration program 46 may utilize these components in a local transformation of gaze computation logic utilized by the gaze tracking system 54 to calibrate the system to produce more accurate estimated gaze locations.

Figure 7:
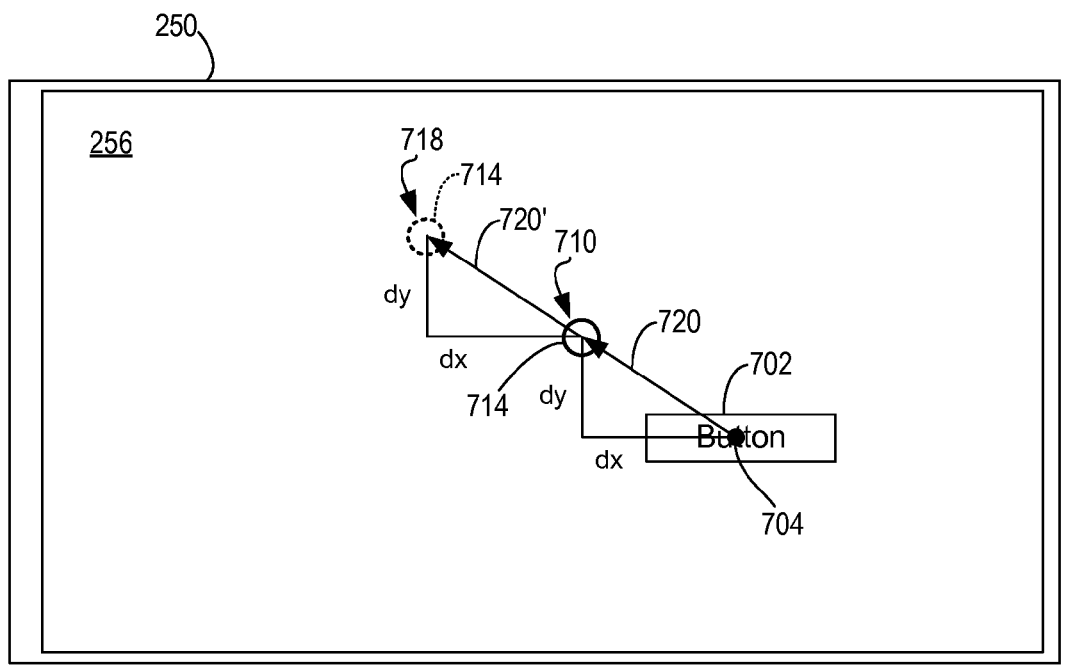
FIGS. 7 and 8 are schematic illustrations of a user interface displayed on a display device that may be used to calibrate the estimated gaze location of a viewer according to another example of the present disclosure.
Figure 8:
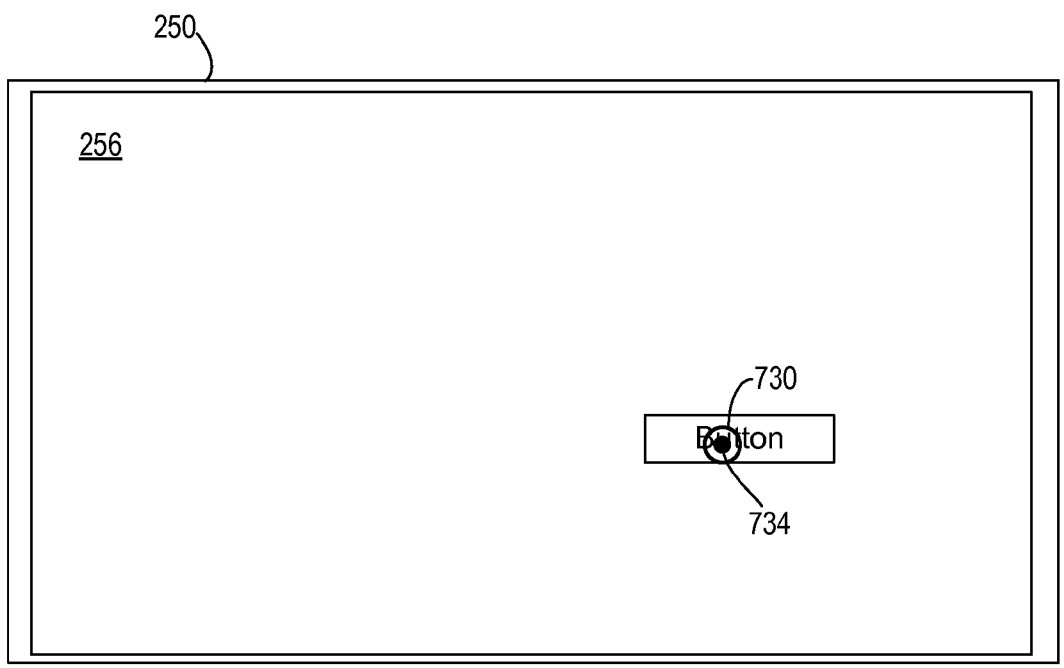

With reference now to FIGS. 7 and 8, in another example the gaze location calibration program 46 may be configured to utilize a live gaze feedback loop to calibrate the gaze tracking system 54. In this example, the gaze tracking system 54 may be configured to control the tablet computer 252 to display selectable button 702 on touch-sensitive screen 256. Viewer Rebecca 248 may naturally gaze at the button 702 when it appears, as indicated by initial actual gaze location indicator 704 in FIG. 7.

The gaze tracking system 54 may estimate an initial estimated (uncalibrated) gaze location 710 of viewer Rebecca 248, and may display a guide visual 714 at the initial estimated gaze location. When viewer Rebecca 248 sees the guide visual 714 appear at the initial estimated gaze location 710, her attention and gaze are naturally attracted to the visual. When viewer Rebecca 248 moves her gaze to the guide visual 714 at initial estimated gaze location 710, the gaze location calibration program 46 may then determine an updated estimated gaze location 718 of viewer Rebecca.

The gaze location calibration program 46 may then display the guide visual 714 at the updated estimated gaze location 718. When viewer Rebecca 248 sees the guide visual 714 appear at the updated estimated gaze location 718, again her gaze is naturally attracted to the visual. When viewer Rebecca 248 moves her gaze to the updated estimated gaze location 718, a subsequent updated estimated gaze location may be determined. It will be appreciated that any number of iterations of the above-described process may be utilized to capture additional data points. It will also be appreciated that the above-described process creates a feedback loop in which an estimated gaze location and corresponding guide visual will move in the same direction as the movement of the actual gaze location of the viewer.

As shown in the example of FIG. 7, the initial estimated gaze location 710 is spaced from the initial actual gaze location indicator 704 by an offset vector 720. Similarly, the updated estimated gaze location 718 is spaced from the initial estimated gaze location 710 by an offset vector 720', which may have substantially the same magnitude as offset vector 720. Utilizing offset vector 720 and offset vector 720', the gaze location calibration program 46 may calibrate the gaze tracking system 54 to generate updated estimated gaze locations of viewer Rebecca in subsequent iterations. In some examples, the gaze location calibration program 46 may utilize the calculated offset vectors to generate and apply a local transformation to gaze computation logic utilized by the gaze tracking system 54 to calibrate the system to produce more accurate estimated gaze locations. For example and with reference to FIG. 8, after calibration the gaze tracking system 54 may generate an estimated gaze location 730 that more closely corresponds to an actual gaze location 734 of the viewer.

Figure 9:
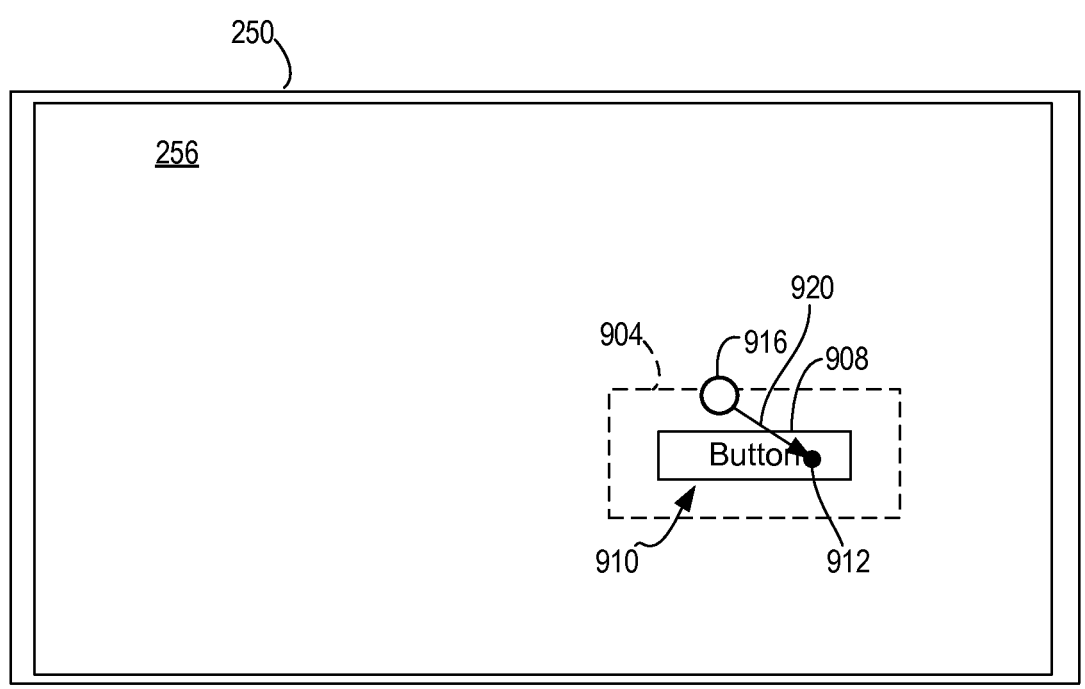
FIG. 9 is a schematic illustration of a user interface displayed on a display device that may be used to calibrate the estimated gaze location of a viewer according to another example of the present disclosure.

With reference now to FIG. 9, in another example the gaze location calibration program 46 may be configured to utilize gaze tracking data 50 over a predetermined timeframe to calibrate the gaze tracking system 54. In one example, the gaze location calibration program 46 may be configured to establish a selection region 904 that encompasses a target visual, such as selectable button 908 located at a target location 910. It will be appreciated that the selection region 904 may comprise any suitable shape that is larger than the target visual.

Viewer Rebecca 248 may fix her gaze at the button 908, as indicated at actual gaze location 912. The gaze location calibration program 46 may determine an estimated gaze location 916 of viewer Rebecca 248 that at least partially overlaps the selection region 904. The gaze location calibration program 46 may determine that the estimated gaze location 916 dwells within at least a portion of the selection region 904 for at least a dwell timeframe. In some examples the period of the dwell timeframe may be 1 second (sec), 2 secs, 3 secs, or any other suitable timeframe.

Based on determining that the estimated gaze location 916 dwells within at least a portion of the selection region 904 for at least the dwell timeframe, the gaze location calibration program 46 may determine that viewer Rebecca 248 is gazing at the button 908 at target location 910 during the dwell timeframe. Accordingly, the gaze location calibration program 46 may then calculate an offset vector 920 between the estimated gaze location 916 and the target location 910 of the button 908, and may use the offset vector to calibrate the gaze tracking system 54 as described above. It will be appreciated that the target location 910 of button 908 may be the centroid of the button, a point on a periphery of the button, or any other suitable location on the button.

Figure 10:
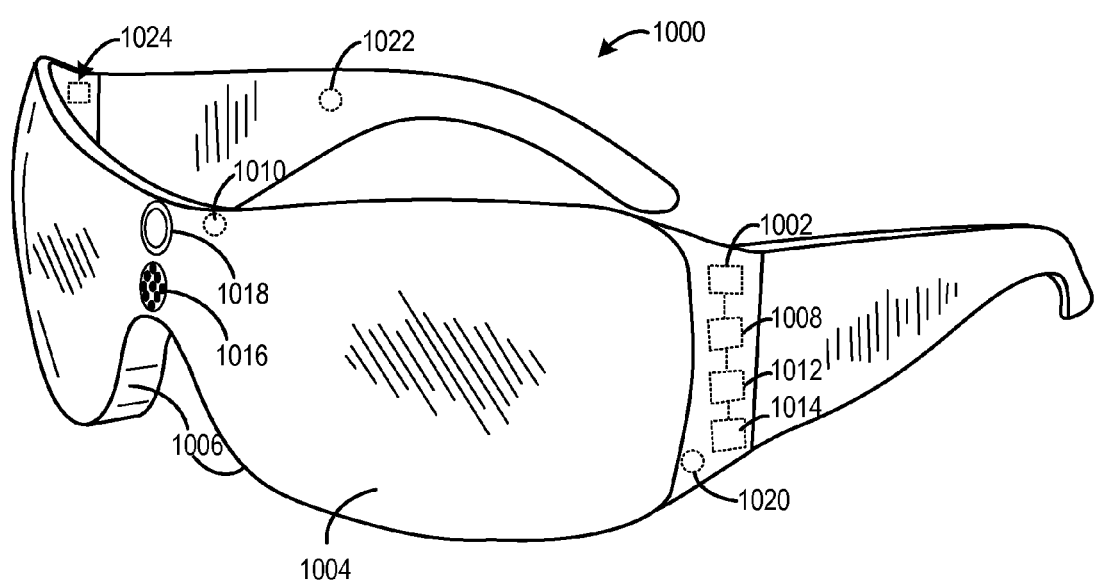
FIG. 10 is a schematic illustration an example head-mounted display device.

With reference now to FIG. 10, one example of an HMD device 1000 in the form of a pair of wearable glasses with a transparent display is provided. It will be appreciated that in other examples, the HMD device 1000 may take other suitable forms in which a transparent, semi-transparent, and/or non-transparent display is supported in front of a viewer's eye or eyes. It will also be appreciated that the HMD devices shown in FIGS. 1 and 2 may take the form of the HMD device 1000, as described in more detail below, or any other suitable HMD device.

The HMD device 1000 includes a display system 1002 and a see-through or transparent display 1004 that enables images such as holographic objects to be delivered to the eyes of a wearer of the HMD device. The transparent display 1004 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 1004 to create an augmented reality environment.

The transparent display 1004 may also be configured to enable a wearer of the HMD device to view a physical, real-world object in the physical environment through one or more partially transparent pixels that are displaying a virtual object representation. As shown in FIG. 10, in one example the transparent display 1004 may include image-producing elements located within lenses 1006 (such as, for example, a see-through Organic Light-Emitting Diode (OLED) display). As another example, the transparent display 1004 may include a light modulator on an edge of the lenses 1006. In this example, the lenses 1006 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 1000 may also include various sensors and related systems. For example, the HMD device 1000 may include a gaze tracking system 1008 that includes one or more image sensors configured to acquire image data in the form of gaze tracking data from a wearer's eyes. Provided the wearer has consented to the acquisition and use of this information, the gaze tracking system 1008 may use this information to track a position and/or movement of the wearer's eyes.

In one example, the gaze tracking system 1008 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources, configured to cause a glint of light to reflect from the cornea of each eye of a wearer. One or more image sensors may then be configured to capture an image of the wearer's eyes.

Images of the glints and of the pupils as determined from image data gathered from the image sensors may be used to determine an optical axis of each eye. Using this information, the gaze tracking system 1008 may then determine a direction the wearer is gazing. The gaze tracking system 1008 may additionally or alternatively determine at what physical or virtual object the wearer is gazing, and at what location on such physical or virtual object the wearer is gazing. Such gaze tracking data may then be provided to the HMD device 1000.

It will also be understood that the gaze tracking system 1008 may have any suitable number and arrangement of light sources and image sensors. For example and with reference to FIG. 10, the gaze tracking system 1008 of the HMD device 1000 may utilize at least one inward facing sensor 1010.

The HMD device 1000 may also include sensor systems that receive physical environment data from the physical environment. For example, the HMD device 1000 may also include a head tracking system 1012 that utilizes one or more pose sensors, such as pose sensors 1014 on HMD device 1000, to capture head pose data and thereby enable position tracking, direction/location and orientation sensing, and/or motion detection of the wearer's head.

In one example, head tracking system 1012 may comprise an inertial measurement unit (IMU) configured as a three-axis or three-degree of freedom position sensor system. This example position sensor system may, for example, include three gyroscopes to indicate or measure a change in orientation of the HMD device 1000 within 3D space about three orthogonal axes (e.g., x, y, and z, or roll, pitch, and yaw). In some examples, the orientation derived from the sensor signals of the IMU may be used to display, via the transparent display 1004, one or more virtual objects with a body-locked position in which the position of each virtual object appears to be fixed relative to the wearer of the see-through display and the position of each virtual object appears to be movable relative to real-world objects in the physical environment.

In another example, head tracking system 1012 may comprise an IMU configured as a six-axis or six-degree of freedom position sensor system. This example position sensor system may, for example, include three accelerometers and three gyroscopes to indicate or measure a change in location of the HMD device 1000 along the three orthogonal axes and a change in device orientation about the three orthogonal axes.

The head tracking system 1012 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 1000 may also include an optical sensor system that utilizes one or more outward facing sensors, such as optical sensor 1016 on HMD device 1000, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 1018. It will be appreciated that any other suitable depth camera may be used within the scope of the present disclosure.

The outward facing sensor(s) may capture images of the physical environment in which a wearer of the HMD device is situated. With respect to the HMD device 1000, in one example an augmented reality display program may include a 3D modeling system that uses such captured images to generate a virtual environment that models the physical environment surrounding the wearer of the HMD device. In some examples, the optical sensor 1016 may cooperate with the IMU to determine the location and the orientation of the HMD device 1000 in six degrees of freedom. Such location and orientation information may be used to display, via the transparent display 1004, one or more virtual objects with a world-locked position in which a position of each virtual object appears to be fixed relative to real-world objects viewable through the transparent display, and the position of each virtual object appears to be movable relative to a wearer of the see-through display.

The HMD device 1000 may also include a microphone system that includes one or more microphones, such as microphone 1020, that capture audio data. In other examples, audio may be presented to the wearer via one or more speakers, such as speaker 1022 on the HMD device 1000.

The HMD device 1000 may also include a controller, such as controller 1024. The controller 1024 may include a logic subsystem and a storage subsystem, as discussed in more detail below with respect to FIG. 12, that are in communication with the various sensors and systems of the HMD device 1000. In one example, the storage subsystem may include instructions that are executable by the logic subsystem to receive signal inputs from the sensors, determine a pose of the HMD device 1000, and adjust display properties for content displayed via the transparent display 1004.

FIGS. 11A and 11B illustrate a flow chart of a method 1100 for calibrating an estimated gaze location of a viewer of a display device according to an implementation of the present disclosure. The following description of method 1100 is provided with reference to the software and hardware components described above and shown in FIGS. 1-10. It will be appreciated that method 1100 may also be performed in other contexts using other suitable hardware and software components.

With reference to FIG. 11A, at 1102 the method 1100 may include monitoring the estimated gaze location of the viewer using gaze tracking data from a gaze tracking system. At 1104 the method 1100 may include receiving image data for display via the display device. At 1106 the method 1100 may include, without using input other than a user's eye gaze direction from the viewer, identifying within the image data at least one target visual that may attract a gaze of the viewer and a target location of the at least one target visual.

At 1108 the method 1100 may include comparing the estimated gaze location of the viewer with the target location of the at least one target visual. At 1110 the method 1100 may include calculating an offset vector based on the estimated gaze location and the target location. At 1114 the method 1100 may include calibrating the gaze tracking system using the offset vector to generate an updated estimated gaze location of the viewer. At 1116 the method 1100 may include estimating a probability that the viewer is gazing at the target location. At 1120 the method 1100 may include utilizing the probability in calculating the offset vector.

With reference now to FIG. 11B, at 1122 the method 1100 may include, from a content source that is providing the image data via a calibration API, receiving a probability that the viewer is gazing at the target location. At 1124 the method 1100 may include utilizing the probability in calculating the offset vector. At 1126 the method 1100 may include, where the image data is received from a content source via a calibration API, and the image data comprises target visual metadata corresponding to the at least one target visual, using the target visual metadata to identify the target location.

At 1128 the method 1100 may include, where the image data comprises a video and the at least one target visual traverses a predetermined path during a target timeframe, monitoring the estimated gaze location during the target timeframe. At 1130 the method 1100 may include comparing the estimated gaze location with the target location of the at least one target visual at a plurality of instances during the target timeframe.

Figure 11C:
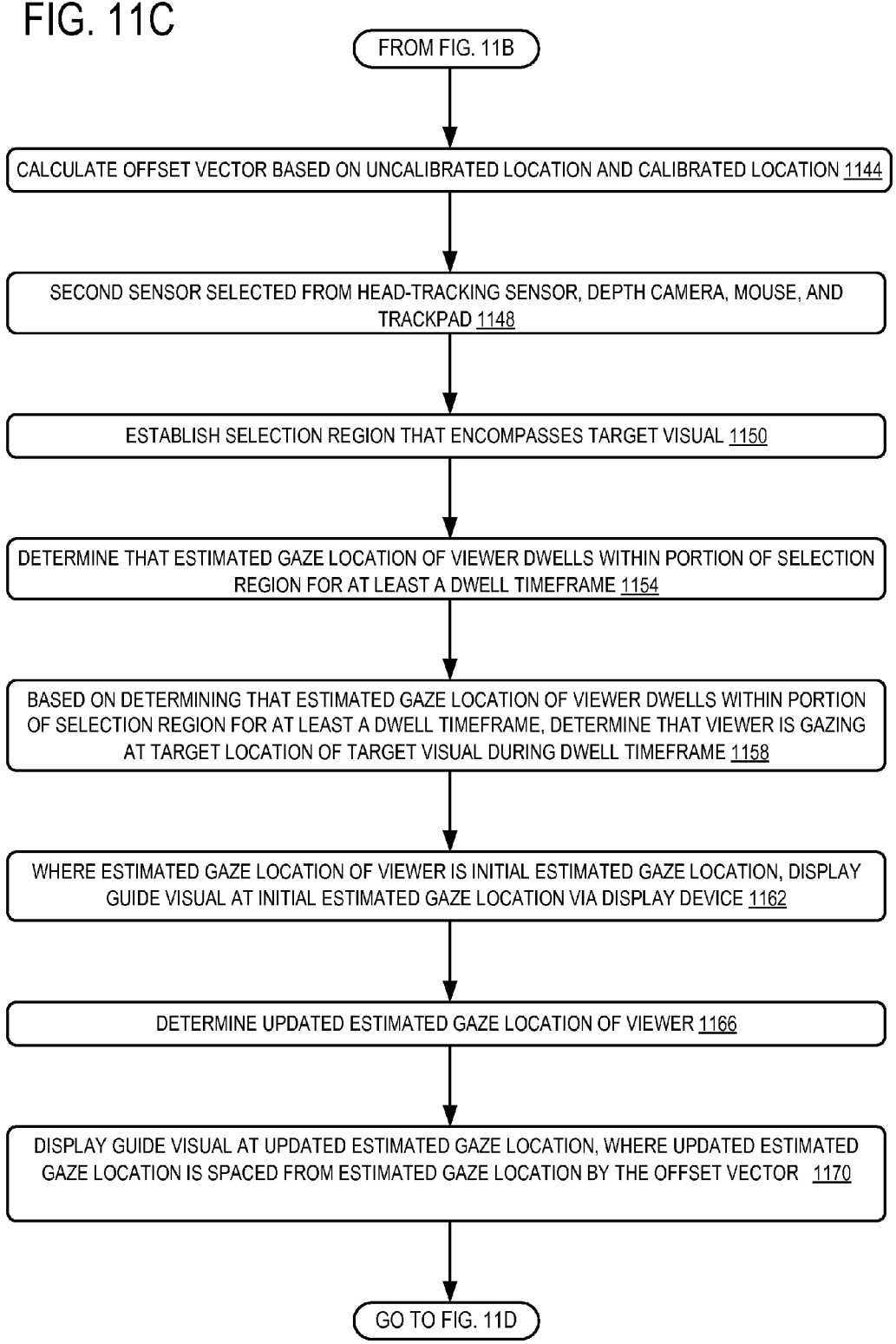

At 1132 the method 1100 may include receiving a first user input via a first sensor. At 1134 the method 1100 may include, in response to receiving the first user input, displaying a guide visual at an uncalibrated location via the display device. At 1136 the method 1100 may include receiving a second user input via a second sensor. At 1140 the method 1100 may include, using the second user input, displaying the guide visual at a calibrated location that corresponds to the target location. With reference now to FIG. 11C, at 1144 the method 1100 may include calculating the offset vector based on the uncalibrated location and the calibrated location.

At 1148 the method 1100 the second sensor may be selected from the group consisting of a head-tracking sensor, a depth camera, a mouse, and a trackpad. At 1150 the method 1100 may include establishing a selection region that encompasses the target visual. At 1154 the method 1100 may include determining that the estimated gaze location of the viewer dwells within at least a portion of the selection region for at least a dwell timeframe. At 1158 the method 1100 may include, based on determining that the estimated gaze location dwells within at least a portion of the selection region for at least the dwell timeframe, determining that the viewer is gazing at the target location of the target visual during the dwell timeframe.

Figure 11D:
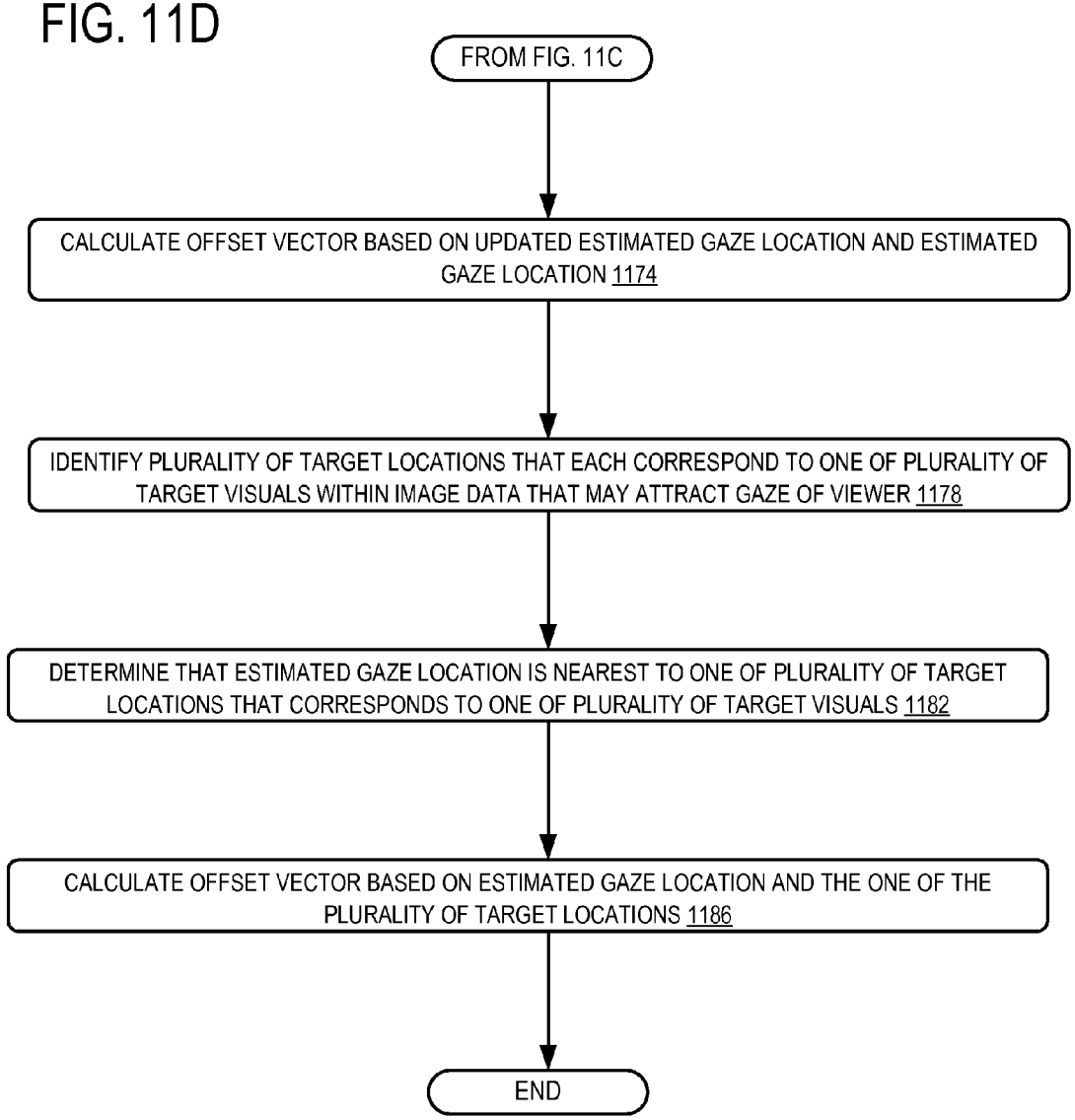

At 1162 the method 1100 may include, where the estimated gaze location of the viewer is an initial estimated gaze location, displaying a guide visual at the initial estimated gaze location via the display device. At 1166 the method 1100 may include determining an updated estimated gaze location of the viewer. At 1170 the method 1100 may include displaying the guide visual at the updated estimated gaze location, where the updated estimated gaze location is spaced from the estimated gaze location by the offset vector. With reference now to FIG. 11D, at 1174 the method 1100 may include calculating the offset vector based on the updated estimated gaze location and the estimated gaze location.

At 1178 the method 1100 may include identifying a plurality of target locations that each correspond to one of a plurality of target visuals within the image data that may attract the gaze of the viewer. At 1182 the method 1100 may include determining that the estimated gaze location is nearest to one of the plurality of target locations that corresponds to one of the plurality of target visuals. At 1186 the method 1100 may include calculating the offset vector based on the estimated gaze location and the one of the plurality of target location.

It will be appreciated that method 1100 is provided by way of example and is not meant to be limiting. Therefore, it is to be understood that method 1100 may include additional and/or alternative steps than those illustrated in FIGS. 11A, 11B, 11C and 11D. Further, it is to be understood that method 1100 may be performed in any suitable order. Further still, it is to be understood that one or more steps may be omitted from method 1100 without departing from the scope of this disclosure.

Figure 12:
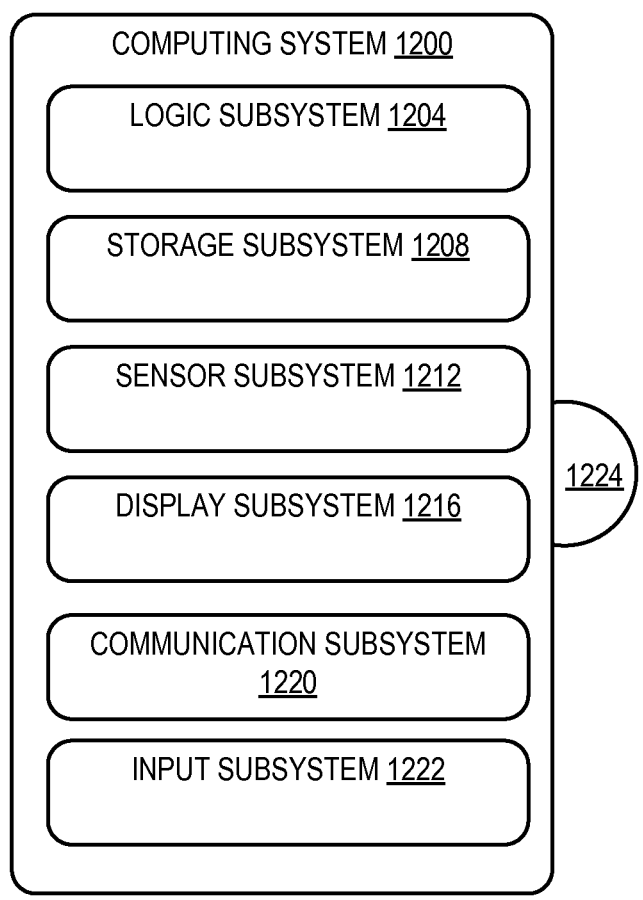
FIG. 12 is a simplified schematic illustration of an example of a computing device.

FIG. 12 schematically shows a nonlimiting example of a computing system 1200 that may perform one or more of the above described methods and processes. Computing device 10 and computing device 12 may take the form of or include one or more aspects of computing system 1200. Computing system 1200 is shown in simplified form. It is to be understood that virtually any computer architecture may be used without departing from the scope of this disclosure. In different examples, computing system 1200 may take the form of a mainframe computer, server computer, desktop computer, tablet computer, home entertainment computer, network computing device, tablet, notebook, smartphone, or other mobile computing device, mobile communication device, gaming device, etc.

As shown in FIG. 12, computing system 1200 includes a logic subsystem 1204 and a storage subsystem 1208. Computing system 1200 may optionally include a sensor subsystem 1212, display subsystem 1216, communication subsystem 1220, input subsystem 1222 and/or other subsystems and components not shown in FIG. 12. Computing system 1200 may also include computer readable media, with the computer readable media including computer readable storage media and computer readable communication media. Computing system 1200 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1204 may include one or more physical devices configured to execute one or more instructions. For example, the logic subsystem 1204 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1204 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1208 may include one or more physical, persistent devices configured to hold data and/or instructions executable by the logic subsystem 1204 to implement the herein described methods and processes. When such methods and processes are implemented, the state of storage subsystem 1208 may be transformed (e.g., to hold different data).

Storage subsystem 1208 may include removable media and/or built-in devices. Storage subsystem 1208 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1208 may include devices with one or more of the following characteristics: volatile, nonvolatile, dynamic, static, read/write, read-only, random access, sequential access, location addressable, file addressable, and content addressable.

In some examples, aspects of logic subsystem 1204 and storage subsystem 1208 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 12 also shows an aspect of the storage subsystem 1208 in the form of removable computer readable storage media 1224, which may be used to store data and/or instructions executable to implement the methods and processes described herein. Removable computer-readable storage media 1224 may take the form of CDs, DVDs, HD-DVDs, Blu-Ray Discs, EEPROMs, and/or floppy disks, among others.

It is to be appreciated that storage subsystem 1208 includes one or more physical, persistent devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, sensor subsystem 1212 may include one or more sensors configured to sense different physical phenomenon (e.g., visible light, infrared light, sound, acceleration, orientation, position, etc.) as described above. Sensor subsystem 1212 may be configured to provide sensor data to logic subsystem 1204, for example. Such data may include gaze tracking information, image information, ambient lighting information, depth information, audio information, position information, motion information, user location information, and/or any other suitable sensor data that may be used to perform the methods and processes described above.

When included, display subsystem 1216 may be used to present a visual representation of data held by storage subsystem 1208. As the above described methods and processes change the data held by the storage subsystem 1208, and thus transform the state of the storage subsystem, the state of the display subsystem 1216 may likewise be transformed to visually represent changes in the underlying data. The display subsystem 1216 may include one or more display devices utilizing virtually any type of technology. Such display devices may be combined with logic subsystem 1204 and/or storage subsystem 1208 in a shared enclosure, or such display devices may be peripheral display devices.

When included, communication subsystem 1220 may be configured to communicatively couple computing system 1200 with one or more networks and/or one or more other computing devices. Communication subsystem 1220 may include wired and/or wireless communication devices compatible with one or more different communication protocols. As nonlimiting examples, the communication subsystem 1220 may be configured for communication via a wireless telephone network, a wireless local area network, a wired local area network, a wireless wide area network, a wired wide area network, etc. In some embodiments, the communication subsystem may allow computing system 1200 to send and/or receive messages to and/or from other devices via a network such as the Internet.

When included, input subsystem 1222 may comprise or interface with one or more sensors or user-input devices such as a game controller, gesture input detection device, voice recognizer, inertial measurement unit, keyboard, mouse, or touch screen. In some embodiments, the input subsystem 1222 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of computing device 10 and computing device 12 that is implemented to perform one or more particular functions. In some cases, such a program may be instantiated via logic subsystem 1204 executing instructions held by storage subsystem 1208. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for calibrating an estimated gaze location of a viewer of a display device, the method comprising:
   monitoring the estimated gaze location of the viewer using gaze tracking data from a gaze tracking system;
   receiving image data for display via the display device, the image data comprising a video that includes at least one target visual that traverses a predetermined path during a target timeframe and attracts a gaze of the viewer, and the image data comprising target visual metadata that identifies the at least one target visual in the video;
   without using another input from the viewer, identifying within the video the at least one target visual;
   without using another input from the viewer, using the target visual metadata to identify the target location of the at least one target visual;
   monitoring the estimated gaze location during the target timeframe;
   estimating a probability that the viewer is gazing at the target location;
   comparing the estimated gaze location of the viewer with the target location of the at least one target visual at a plurality of instances during the target timeframe;
   calculating an offset vector based on the estimated gaze location and the target location, and wherein calculating the offset vector further comprises utilizing the probability in calculating the offset vector; and
   calibrating the gaze tracking system using the offset vector to generate an updated estimated gaze location of the viewer.

2. The method of claim 1, further comprising:
   from a content source that is providing the image data via a calibration application programming interface, receiving a probability that the viewer is gazing at the target location; and wherein calculating the offset vector further comprises utilizing the probability in calculating the offset vector.

3. The method of claim 1, further comprising:
receiving a first user input via a first sensor;
in response to receiving the first user input, displaying a guide visual at an uncalibrated location via the display device;
receiving a second user input via a second sensor;
using the second user input, displaying the guide visual at a calibrated location that corresponds to the target location; and
calculating the offset vector based on the uncalibrated location and the calibrated location.

4. The method of claim 3, wherein the second sensor is selected from the group consisting of a head-tracking sensor, a depth camera, a mouse, and a trackpad.

5. The method of claim 1, further comprising:
establishing a selection region that encompasses the target visual;
determining that the estimated gaze location of the viewer dwells within at least a portion of the selection region for at least a dwell timeframe;
based on determining that the estimated gaze location dwells within at least a portion of the selection region for at least the dwell timeframe, determining that the viewer is gazing at the target location of the target visual during the dwell timeframe.

6. The method of claim 1, wherein the estimated gaze location of the viewer is an initial estimated gaze location, and further comprising:
displaying a guide visual at the initial estimated gaze location via the display device;
determining an updated estimated gaze location of the viewer;
displaying the guide visual at the updated estimated gaze location, wherein the updated estimated gaze location is spaced from the estimated gaze location by the offset vector; and
calculating the offset vector based on the updated estimated gaze location and the estimated gaze location.

7. The method of claim 1, further comprising:
identifying a plurality of target locations that each correspond to one of a plurality of target visuals within the image data that attract the gaze of the viewer;
determining that the estimated gaze location is nearest to one of the plurality of target locations that corresponds to one of the plurality of target visuals; and
calculating the offset vector based on the estimated gaze location and the one of the plurality of target locations.

8. A computing device for calibrating an estimated gaze location of a viewer of a display device, the computing device comprising:
a gaze location calibration program executed by a processor of the computing device, the gaze location calibration program configured to:
monitor the estimated gaze location of the viewer using gaze tracking data from a gaze tracking system;
receive image data for display via the display device, the image data comprising a video that includes at least one target visual that traverses a predetermined path during a target timeframe and attracts a gaze of the viewer, and the image data comprising target visual metadata that identifies the at least one target visual in the video;
without using another input from the viewer, identify within the video the at least one target visual;
without using another input from the viewer, use the target visual metadata to identify the target location of the at least one target visual;
monitoring the estimated gaze location during the target timeframe;
estimating a probability that the viewer is gazing at the target location; and
compare the estimated gaze location of the viewer with the target location of the at least one target visual at a plurality of instances during the target timeframe;
calculate an offset vector based on the estimated gaze location and the target location, wherein calculating the offset vector further comprises utilizing the probability in calculating the offset vector, and based on a probability that the viewer is gazing at the target location; and
calibrate the gaze tracking system using the offset vector to generate an updated estimated gaze location of the viewer.

9. The computing device of claim 8, wherein the gaze location calibration program is further configured to receive the probability via a calibration application programming interface in a content source that is providing the image data.

10. The computing device of claim 8, wherein the gaze location calibration program is further configured to:
receive a first user input via a first sensor;
in response to receiving the first user input, control the display device to display a guide visual at an uncalibrated location;
receive a second user input via a second sensor;
using the second user input, control the display device to display the guide visual at a calibrated location that corresponds to the target location; and
calculate the offset vector based on the uncalibrated location and the calibrated location.

11. The computing device of claim 10, wherein the second sensor is selected from the group consisting of a head-tracking sensor, a depth camera, a mouse, and a trackpad.

12. The computing device of claim 8, wherein the gaze location calibration program is further configured to:
establish a selection region that encompasses the target visual;
determine that the estimated gaze location of the viewer dwells within at least a portion of the selection region for at least a dwell timeframe;
based on determining that the estimated gaze location dwells within at least a portion of the selection region for at least the dwell timeframe, determine that the viewer is gazing at the target location of the target visual during the dwell timeframe.

13. The computing device of claim 8, wherein the estimated gaze location of the viewer is an initial estimated gaze location, and the gaze location calibration program is further configured to:
display a guide visual at the initial estimated gaze location via the display device;
determine an updated estimated gaze location of the viewer;
display the guide visual at the updated estimated gaze location, wherein the updated estimated gaze location is spaced from the estimated gaze location by the offset vector; and
calculate the offset vector based on the updated estimated gaze location and the estimated gaze location.

14. A head-mounted display device configured to display image data to a viewer wearing the device, the image data comprising a video that includes at least one target visual that traverses a predetermined path during a target timeframe and attracts a gaze of the viewer, and the image data comprising target visual metadata that identifies the at least one target visual in the video, the head-mounted display device comprising:
- a computing device;
- a gaze tracking system configured to provide to the computing device gaze tracking data of the viewer; and
- a gaze location calibration program executed by a processor of the computing device, the gaze location calibration program configured to:
  - monitor an estimated gaze location of the viewer using the gaze tracking data during the target timeframe;
  - without using another input from the viewer, identify within the image data the at least one target visual that attracts a gaze of the viewer;
  - without using another input from the viewer, use the target visual metadata to identify the target location of the at least one target visual;
  - compare the estimated gaze location of the viewer with the target location of the at least one target visual at a plurality of instances during the target timeframe;
  - calculate an offset vector based on the estimated gaze location, the target location, and a probability that the viewer is gazing at the target location; and
  - calibrate the gaze tracking system using the offset vector to generate an updated estimated gaze location of the viewer.

* * * * *